United States Patent
Cheng et al.

(10) Patent No.: US 12,043,731 B2
(45) Date of Patent: Jul. 23, 2024

(54) USE OF POLYVINYLACETATE POLYMERS OR COPOLYMERS TO INCREASE THE VISCOSITY OF THE ISOCYANATE COMPONENT OF A TWO-COMPONENT CURABLE POLYMERIC SYSTEM

(71) Applicant: Henkel AG & Co. KGaA, Duesseldorf (DE)

(72) Inventors: Chih-Min Cheng, Westford, MA (US); Zachary Bryan, Middletown, CT (US); James Murray, Newmarket, NH (US); Li Kang, Middletown, CT (US); Shuhua Jin, Cheshire, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 379 days.

(21) Appl. No.: 17/204,181

(22) Filed: Mar. 17, 2021

(65) Prior Publication Data

US 2021/0198471 A1    Jul. 1, 2021

Related U.S. Application Data

(63) Continuation of application No. PCT/US2019/053701, filed on Sep. 28, 2019.
(Continued)

(51) Int. Cl.
*C08L 31/04* (2006.01)
*C08L 75/06* (2006.01)

(52) U.S. Cl.
CPC ............... *C08L 31/04* (2013.01); *C08L 75/06* (2013.01); *C08L 2205/03* (2013.01)

(58) Field of Classification Search
CPC ........................ C08L 31/04; C09J 175/04–10
See application file for complete search history.

(56) References Cited

U.S. PATENT DOCUMENTS 4,087,392 A * 5/1978 Hartmann ............... C09J 175/04
524/270
4,250,274 A * 2/1981 Damico ................. C08G 18/10
428/458
(Continued)

FOREIGN PATENT DOCUMENTS

CN    103025783 A    4/2013
CN    105925217 B    2/2018
(Continued)

OTHER PUBLICATIONS

International Search Report for International PCT Patent Application No. PCT/US2019/053701 dated Feb. 12, 2020.

*Primary Examiner* — Michael M Dollinger
(74) *Attorney, Agent, or Firm* — James E. Piotrowski

(57) ABSTRACT

Disclosed is a two-component curable polymeric system having increased viscosity. One component contains a homogeneous blend of a polyisocyanate and a homopolymer or copolymer of vinyl acetate. This component has a higher viscosity than the polyisocyanate alone, thereby increasing the viscosity of the two-component curable system. The other component of the two-component curable system is a composition containing an isocyanate reactive component. The polyisocyanate and the isocyanate reactive component react together ("cure") to form a polymer. Typically, but not always, the isocyanate reactive component is a polyol or polyamine that is capable of reacting with the polyisocyanate, thereby forming a polyurethane (polyol) or polyurea (polyamine).

13 Claims, 3 Drawing Sheets

Related U.S. Application Data

(60) Provisional application No. 62/738,070, filed on Sep. 28, 2018.

(56) References Cited

U.S. PATENT DOCUMENTS

| | | | |
|---|---|---|---|
| 4,393,186 A * | 7/1983 | Damico | C08G 18/10 |
| | | | 528/49 |
| 5,872,183 A | 2/1999 | Bonnet et al. | |
| 2002/0143133 A1 | 10/2002 | Imai et al. | |
| 2016/0280977 A1* | 9/2016 | Chen | C08G 18/4202 |
| 2017/0002240 A1 | 1/2017 | Ostlund et al. | |

FOREIGN PATENT DOCUMENTS

| | | |
|---|---|---|
| CN | 107868442 A | 4/2018 |
| MY | 140974 A | 2/2010 |
| WO | 2018149672 A1 | 8/2018 |

\* cited by examiner

USE OF POLYVINYLACETATE POLYMERS OR COPOLYMERS TO INCREASE THE VISCOSITY OF THE ISOCYANATE COMPONENT OF A TWO-COMPONENT CURABLE POLYMERIC SYSTEM

FIELD OF THE INVENTION

This invention relates to two-component curable polyurethane systems. One component of such systems comprises a polyisocyanate comprising an average of at least two isocyanate functionalities per molecule. The other component of the two-component system is a composition comprising an isocyanate reactive component. The two components must be stored separately. The two components are mixed just before use and react together ("cure") to form a polymer, generally in 1 to 8 hours or in some cases as long as 72 hours after mixing. Typically, but not always, the isocyanate reactive component is a polyol or polyamine that is capable of reacting with the polyisocyanate, thereby forming a polyurethane (if a polyol is reacted) or polyurea (if a polyamine is reacted). Specifically, this invention relates to increasing the viscosity of the polyisocyanate component of these two-component curable polyurethane systems, thereby also increasing the viscosity of the mixed two-component curable polyurethane system.

BACKGROUND OF THE INVENTION

Mixed two-component curable polyurethane adhesive systems can be applied using a number of methods. Viscosity of the newly mixed adhesive will be a composite of the viscosity of each component. Each application method will require the newly mixed adhesive to be within a defined viscosity range for successful use; below this range the applied mixture will spread and run and above this range the mixed adhesive may not apply evenly or at all. Two-component curable polyurethane systems have traditionally relied on modification of the polyol component to effectively increase the viscosity or "thicken" mixtures of the two components. There currently are very few options available to effectively thicken the polyisocyanate component. The most common method of increasing viscosity of the polyisocyanate component is to make an isocyanate functional pre-polymer, but prepolymer production requires special reaction processes and equipment and prepolymer use may raise TSCA (Toxic Substances Control Act) or other regulatory concerns. Production of a pre-polymer can introduce repeatability issues as well. Other common techniques for increasing viscosity of the polyisocyanate component include incorporating materials like silica into the polyisocyanate component. However, silica thixotropes when mixed with polyisocyanates introduce shear thinning properties, can react with the isocyanate, and lead to de-gassing issues.

Until now, there have been few efforts to determine the effect on physical properties of mixed two-component adhesives having polyvinyl acetate polymers and copolymers blended in significant amounts with the polyisocyanate component of these two-component adhesives.

SUMMARY OF THE INVENTION

The inventors have unexpectedly discovered that polyvinyl acetate homopolymer and copolymers are not only compatible but form a homogeneous mixture with the polyisocyanate that remained stable indefinitely. Furthermore, the vinyl acetate homopolymer or copolymer with vinyl chloride surprisingly increased the viscosity of the polyisocyanate component of two-component curable polymer systems, while maintaining a Newtonian viscosity. Two-component polyurethane systems incorporating the vinyl acetate homopolymer or copolymer with vinyl chloride in the polyisocyanate component can be used for such applications as potting, coatings, and adhesives, for instance. Due to the Newtonian viscosity characteristics, such systems are particularly suitable for potting compounds, where the Newtonian viscosity imparts a "self-leveling" property. The adhesion of such systems, if used as adhesives, was not significantly degraded beyond the expected effect of dilution of the polyisocyanate component due to the addition of the vinyl acetate homopolymer or copolymer with vinyl chloride material.

One embodiment comprises a polyisocyanate component for a two-component polyurethane composition which is a homogeneous mixture comprising: a) a polyisocyanate; and b) a polymer comprising vinyl acetate as polymerized units.

In one embodiment the polyisocyanate a) has an average isocyanate functionality of at least 2 and has a viscosity of at least 10 mPa·sec measured on a DV-III Brookfield Viscometer using RV spindle 6, at either 2 RPM or 20 RPM, conditioned for at least 12 hours at 25° C. with RV Spindle 6, prior to the addition of the polymer comprising vinyl acetate as polymerized units. The homogeneous polyisocyanate component comprising a) and b) has a viscosity measured on a DV-III Brookfield Viscometer using RV spindle 6, at either 2 RPM or 20 RPM, conditioned for at least 12 hours at 25° C. with RV Spindle 6 of at least 250 mPa·sec.

In certain embodiments, the viscosity of the mixture of a) and b) was 600 times higher (under the same conditions) than the viscosity of a) alone.

In other embodiments the viscosity of the composition a) and b) remained generally Newtonian even with the significant increase in viscosity.

The invention also encompasses a two-component polyurethane system, including A) a first isocyanate reactive component and B) a second component comprising a mixture of polyisocyanate and a copolymer comprising vinyl acetate and vinyl chloride as polymerized units.

The invention is also directed to the homogenously mixed two-component polyurethane composition comprising A) a first isocyanate reactive component; and B) a second component comprising a mixture of polyisocyanate and a polymer comprising vinyl acetate as polymerized units and/or a copolymer comprising vinyl acetate and vinyl chloride as polymerized units; and the reaction product of this mixture of A) and B).

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION OF THE INVENTION

Figure 1:
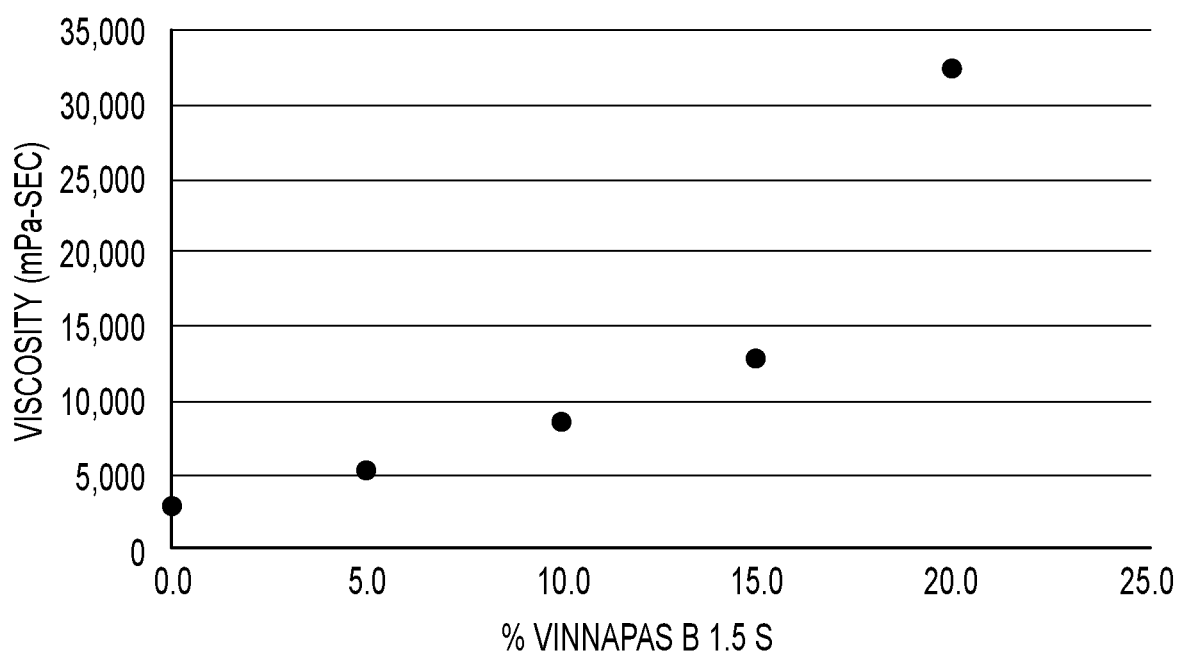
FIG. 1 shows the viscosity of a composition according to one embodiment of the invention.

Unless defined otherwise, all technical and scientific terms used herein have the same meaning as is commonly understood by one of ordinary skill in the art. As used herein for each of the various embodiments, the following definitions apply.

"Alkyl" or "alkane" refers to a hydrocarbon chain or group containing only single bonds between the chain carbon atoms. The alkane can be a straight hydrocarbon chain or a branched hydrocarbon group. The alkane can be cyclic. The alkane can contain 1 to 20 carbon atoms, advantageously 1 to 10 carbon atoms and more advantageously 1 to 6 carbon atoms. In some embodiments the alkane can be substituted. Exemplary alkanes include methyl, ethyl, n-propyl, isopropyl, isobutyl, n-butyl, sec-butyl, tert-butyl, isopentyl, neopentyl, tert-pentyl, isohexyl and decyl.

"Alkenyl" or "alkene" refers to a hydrocarbon chain or group containing one or more double bonds between the chain carbon atoms. The alkenyl can be a straight hydrocarbon chain or a branched hydrocarbon group. The alkene can be cyclic. The alkene can contain 1 to 20 carbon atoms, advantageously 1 to 10 carbon atoms and more advantageously 1 to 6 carbon atoms. The alkene can be an allyl group. The alkene can contain one or more double bonds that are conjugated. In some embodiments the alkene can be substituted.

"Alkoxy" refers to the structure —OR, wherein R is hydrocarbyl.

"Alkyne" or "alkynyl" refers to a hydrocarbon chain or group containing one or more triple bonds between the chain carbon atoms. The alkyne can be a straight hydrocarbon chain or a branched hydrocarbon group. The alkyne can be cyclic. The alkyne can contain 1 to 20 carbon atoms, advantageously 1 to 10 carbon atoms and more advantageously 1 to 6 carbon atoms. The alkyne can contain one or more triple bonds that are conjugated. In some embodiments the alkyne can be substituted.

"Amine" refers to a molecule comprising at least one —NHR group wherein R can be a covalent bond, H, hydrocarbyl or polyether. In some embodiments an amine can comprise a plurality of —NHR groups.

"Aryl" or "Ar" refers to a monocyclic or multicyclic aromatic group. The cyclic rings can be linked by a bond or fused. The aryl can contain from 6 to about 30 carbon atoms; advantageously 6 to 12 carbon atoms and in some embodiments 6 carbon atoms. Exemplary aryls include phenyl, biphenyl and naphthyl. In some embodiments the aryl is substituted.

"Ester" refers to the structure R—C(O)—O—R' where R and R' are independently selected hydrocarbyl groups with or without heteroatoms. The hydrocarbyl groups can be substituted or unsubstituted.

"Halogen" or "halide" refers to an atom selected from fluorine, chlorine, bromine and iodine.

"Hetero" refers to one or more heteroatoms in a structure. Exemplary heteroatoms are independently selected from N, O and S.

"Heteroaryl" refers to a monocyclic or multicyclic aromatic ring system wherein one or more ring atoms in the structure are heteroatoms. Exemplary heteroatoms are independently selected from N, O and S. The cyclic rings can be linked by a bond or fused. The heteroaryl can contain from 5 to about 30 carbon atoms; advantageously 5 to 12 carbon atoms and in some embodiments 5 to 6 carbon atoms. Exemplary heteroaryls include furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl and isoquinolinyl. In some embodiments the heteroaryl is substituted.

"Hydrocarbyl" refers to a group containing carbon and hydrogen atoms. The hydrocarbyl can be linear, branched, or cyclic group. The hydrocarbyl can be alkyl, alkenyl, alkynyl or aryl. In some embodiments, the hydrocarbyl is substituted.

"(Meth)acrylate" refers to acrylate and methacrylate.

"Molecular weight" refers to weight average molecular weight unless otherwise specified. The number average molecular weight Mn, as well as the weight average molecular weight MW, is determined according to the present invention by gel permeation chromatography (GPC, also known as SEC) at 23° C. using a styrene standard. This method is known to one skilled in the art. The polydispersity is derived from the average molecular weights MW and Mn. It is calculated as PD=Mw/Mn. Polydispersity indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution.

"Oligomer" refers to a defined, small number of repeating monomer units such as 2-5,000 units, and advantageously 10-1,000 units which have been polymerized to form a molecule. Oligomers are a subset of the term polymer.

"Polyether" refers to polymers which contain multiple ether groups (each ether group comprising an oxygen atom connected top two hydrocarbyl groups) in the main polymer chain. The repeating unit in the polyether chain can be the same or different. Exemplary polyethers include homopolymers such as polyoxymethylene, polyethylene oxide, polypropylene oxide, polybutylene oxide, polytetrahydrofuran, and copolymers such as poly(ethylene oxide co propylene oxide), and EO tipped polypropylene oxide.

"Polyester" refers to polymers which contain multiple ester linkages. A polyester can be either linear or branched.

"Polymer" refers to any polymerized product greater in chain length and molecular weight than the oligomer. Polymers can have a degree of polymerization of about 20 to about 25000. As used herein polymer includes oligomers and polymers.

"Polyol" refers to the molecule comprising two or more —OH groups.

"Substituted" refers to the presence of one or more substituents on a molecule in any possible position. Useful substituents are those groups that do not significantly diminish the disclosed reaction schemes. Exemplary substituents include, for example, H, halogen, (meth)acrylate, epoxy, oxetane, urea, urethane, $N_3$, NCS, CN, NCO, $NO_2$, $NX^1X^2$, $OX^1$, $C(X^1)_3$, $C(halogen)_3$, $COOX^1$, $SX^1$, $Si(OX^1)iX^2_{3-i}$, alkyl, alcohol, alkoxy; wherein $X^1$ and $X^2$ each independently comprise H, alkyl, alkenyl, alkynyl or aryl and i is an integer from 0 to 3.

"thiol" refers to a molecule comprising at least one —SH group. In some embodiments a thiol can comprise a plurality of —SH groups.

This invention relates to two-component or two-part curable polymeric systems. One component of such systems is a polyisocyanate component. The other component of the two-part curable polymeric system comprises an isocyanate reactive material that is capable of reacting with the polyisocyanate material to form a cured polymeric material.

Polyvinyl acetate or copolymers thereof, especially copolymers comprising vinyl chloride in addition to vinyl acetate as polymerized units are effective at increasing the viscosity of polyisocyanates and surprisingly effective at increasing viscosity of methylene diphenyl diisocyanate (MDI) based polyisocyanates including but not limited to polymeric MDI, polyisocyanate pre-polymers, modified polyisocyanate pre-polymers, MDI pre-polymers, allophanates of MDI, and modified MDI pre-polymers.

The term "pre-polymer" in this disclosure is understood to mean a material that is synthesized by reacting a stoichiometric excess of a polyisocyanate with a polyisocyanate reactive material, such that the resulting material retains unreacted isocyanate groups.

As an example, for a polyisocyanate reacting with a polyol, "stoichiometric excess" is understood to mean that there are more equivalents of isocyanate functionality from the polyisocyanate compound than equivalents of hydroxyl functionality from the polyol present during reaction to form the pre-polymer. All of the polyol is reacted and the resulting polyisocyanate pre-polymers comprise reactive isocyanate groups. In this disclosure, it is to be understood that the term "polyisocyanate pre-polymer" is applied to any compound made according to the foregoing description, i.e., as long as the compound is made with a stoichiometric excess of isocyanate groups to hydroxyl groups, it is a pre-polymer.

The polymers comprising as polymerized units, either vinyl acetate or vinyl acetate and vinyl chloride described herein, when blended together to for a homogenous mixture with the polyisocyanate component can effectively increase the viscosity of the polyisocyanate component without introducing shear thinning characteristics and is shown to increase the viscosity of the polyisocyanate as much as 6000% compared to polyisocyanate without added polymers.

Polyisocyanate Component

The polyisocyanate component comprises polymeric diphenylmethanediisocyante (MDI), isocyanate functional pre-polymer, or mixtures thereof. Such components are understood to have on average two or more isocyanate groups. Polymeric MDI is a known commercially available variant of MDI. It is not a pre-polymer but rather "linked" MDI molecules. Polyisocyanate components that are 100% monomeric polyisocyanates do not show the surprising advantages. However, polyisocyanate components comprising up to about 50% by weight monomeric polyisocyanates do show advantageous properties. In some embodiments the polyisocyanate component comprises about 50% or less by weight monomeric polyisocyanates by weight of the polyisocyanate component. Monomeric MDI and its isomers are preferred and may be used exclusively if monomeric polyisocyanates are present in the polyisocyanate component. In some embodiments the polyisocyanate component preferably comprises polymeric MDI, a MDI pre-polymer, monomeric MDI or mixtures thereof.

Some suitable polyisocyanates useful for preparing the isocyanate functional pre-polymers include hydrogenated MDI (HMDI), xylylene diisocyanate (XDI), tetramethyl xylylene diisocyanate (TMXDI), 4,4'-diphenyl dimethylmethane diisocyanate, di- and tetraalkylene diphenylmethane diisocyanate, 4,4'-dibenzyl diisocyanate, 1,3-phenylene diisocyanate, 1,4-phenylene diisocyanate, 1-methyl-2,4-diisocyanatocyclohexane, 1,6-diiso-cyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclo-hexane-1,4-diisocyanate, ethylene diisocyanate, phthalic acid-bis-isocyanatoethyl ester; diisocyanates containing reactive halogen atoms, such as 1-chloromethylphenyl-2,4-diisocyanate, 1-bromomethylphenyl-2,6-diisocyanate or 3,3-bis-chloromethylether4,4'-diphenyl diisocyanate, trimethyl hexamethylene diisocyanate, 1,4-diisocyanatobutane, 1,12-diisocyanatododecane, dimer fatty acid diisocyanate, tetramethylene diisocyanate, hexamethylene diisocyanate, undecane diisocyanate, dodecamethylene diisocyanate, 2,2,4-trimethylhexane-2,3,3-trimethylhexamethylene diisocyanate, 1,3-cyclohexane diisocyanate, 1,4-cyclohexane diisocyanate, 1,3- and 1,4-tetramethyl xylene diisocyanate, isophorone, 4,4-dicyclohexylmethane, tetramethylxylylene (TMXDI) and lysine ester diisocyanate.

Some suitable polyisocyanates include aromatic polyisocyanates. Aromatic polyisocyanates are characterized by the fact that the isocyanate groups are positioned directly on the benzene ring. Suitable aromatic diisocyanates include 4,4'-diphenyl methane diisocyanate (MDI) and its isomers, toluene diisocyanate (TDI) and its isomers and naphthalene-1, 5-diisocyanate (NDI).

Some suitable polyisocyanates include sulfur-containing polyisocyanates that are obtained, for example, by reaction of 2 mol hexamethylene diisocyanate with 1 mol thiodiglycol or dihydroxydihexyl sulfide.

Aliphatic polyisocyanates with two or more isocyanate functionality formed by biuret linkage, uretdione linkage, allophanate linkage, and/or by trimerization are suitable.

Suitable at least trifunctional polyisocyanates are polyisocyanates formed by trimerization or oligomerization of diisocyanates or by reaction of diisocyanates with polyfunctional compounds containing hydroxyl or amino groups. Isocyanates suitable for the production of trimers are the diisocyanates mentioned above, the trimerization products of HDI, MDI, TDI or IPDI being particularly preferred.

The polyisocyanate component encompasses a single polyisocyanate or the mixture of two or more polyisocyanates.

Isocyanate Reactive Component

As used herein an isocyanate reactive compound is a compound containing functional moieties that will react with an isocyanate moiety. The isocyanate reactive component can be a single compound comprising an alcohol moiety, an amine moiety, a thiol moiety, or a compound with a combination of these moieties. The isocyanate reactive component can be a mixture of compounds with each compound comprising one or more moieties independently selected from alcohol, amine, thiol and aminoalcohol.

In one embodiment the isocyanate reactive component can be a polyol. A polyol is understood to be a compound containing more than one OH group in the molecule. A polyol can further have other functionalities on the molecule. The term "polyol" encompasses a single polyol or a mixture of two or more polyols.

Some suitable polyol components include aliphatic alcohols containing 2 to 8 OH groups per molecule. The OH groups may be both primary and secondary. Some suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs or isomers thereof which the expert can obtain by extending the hydrocarbon chain by one $CH_2$ group at a time or by introducing branches into the carbon chain. Also suitable are higher alcohols such as, for example, glycerol, trimethylol propane, pentaerythritol and oligomeric ethers of the substances mentioned either individually or in the form of mixtures of two or more of the ethers mentioned with one another.

Some suitable polyols include the reaction products of low molecular weight polyhydric alcohols with alkylene oxides, so-called polyether polyols. The alkylene oxides preferably contain 2 to 4 carbon atoms. Some reaction products of this type include, for example, the reaction products of ethylene glycol, propylene glycol, the isomeric butane diols, hexane diols or 4,4'-dihydroxydiphenyl propane with ethylene oxide, propylene oxide or butylene oxide or mixtures of two or more thereof. The reaction products of polyhydric alcohols, such as glycerol, trimethylol ethane or trimethylol propane, pentaerythritol or sugar alcohols or mixtures of two or more thereof, with the alkylene oxides mentioned to form polyether polyols are also suitable. Thus, depending on the desired molecular weight, products of the addition of only a few mol ethylene oxide and/or propylene oxide per mol or of more than one hundred mol ethylene oxide and/or propylene oxide onto low molecular weight polyhydric alcohols may be used. Other polyether polyols are obtainable by condensation of, for example, glycerol or pentaerythritol with elimination of water. Some suitable polyols include those polyols obtainable by polymerization of tetrahydrofuran.

The polyethers are reacted in known manner by reacting the starting compound containing a reactive hydrogen atom with alkylene oxides, for example ethylene oxide, propylene oxide, butylene oxide, styrene oxide, tetrahydrofuran or epichlorohydrin or mixtures of two or more thereof.

Suitable starting compounds are, for example, water, ethylene glycol, 1,2- or 1,3-propylene glycol, 1,4- or 1,3-butylene glycol, hexane-1,6-diol, octane-1,8-diol, neopentyl glycol, 1,4-hydroxymethyl cyclohexane, 2-methyl propane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononylphenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenylpolymethylene polyamines, which may be obtained by aniline/formaldehyde condensation, or mixtures of two or more thereof.

Some suitable polyols include diol EO/PO (ethylene oxide/propylene oxide) block copolymers, EO-tipped polypropylene glycols, or alkoxylated bisphenol A.

Some suitable polyols include polyether polyols modified by vinyl polymers. These polyols can be obtained, for example, by polymerizing styrene or acrylonitrile or mixtures thereof in the presence of polyetherpolyol.

Some suitable polyols include polyester polyols. For example, it is possible to use polyester polyols obtained by reacting low molecular weight alcohols, more particularly ethylene glycol, diethylene glycol, neopentyl glycol, hexanediol, butanediol, propylene glycol, glycerol or trimethylol propane, with caprolactone. Other suitable polyhydric alcohols for the production of polyester polyols are 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol.

Some suitable polyols include polyester polyols obtained by polycondensation. Thus, dihydric and/or trihydric alcohols may be condensed with less than the equivalent quantity of dicarboxylic acids and/or tricarboxylic acids or reactive derivatives thereof to form polyester polyols. Suitable dicarboxylic acids are, for example, adipic acid or succinic acid and higher homologs thereof containing up to 16 carbon atoms, unsaturated dicarboxylic acids, such as maleic acid or fumaric acid, cyclohexane dicarboxylic acid (CHDA), and aromatic dicarboxylic acids, more particularly the isomeric phthalic acids, such as phthalic acid, isophthalic acid or terephthalic acid. Citric acid and trimellitic acid, for example, are also suitable tricarboxylic acids. The acids mentioned may be used individually or as mixtures of two or more thereof. Polyester polyols of at least one of the dicarboxylic acids mentioned and glycerol which have a residual content of OH groups are suitable. Suitable alcohols include but not limited to propylene glycol, butane diol, pentane diol, hexanediol, ethylene glycol, diethylene glycol, triethylene glycol, dipropylene glycol, tripropylene glycol, cyclohexanedimethanol (CHDM), 2-methyl-1,3-propanediol (MPDiol), or neopentyl glycol or isomers or derivatives or mixtures of two or more thereof. High molecular weight polyester polyols may be used in the second synthesis stage and include, for example, the reaction products of polyhydric, preferably dihydric, alcohols (optionally together with small quantities of trihydric alcohols) and polybasic, preferably dibasic, carboxylic acids. Instead of free polycarboxylic acids, the corresponding polycarboxylic anhydrides or corresponding polycarboxylic acid esters with alcohols preferably containing 1 to 3 carbon atoms may also be used (where possible). The polycarboxylic acids may be aliphatic, cycloaliphatic, aromatic or heterocyclic or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

The polyester polyol may optionally contain a small number of terminal carboxyl groups. Polyesters obtainable from lactones, for example based on ϵ-caprolactone (also known as "polycaprolactones"), or hydroxycarboxylic acids, for example w-hydroxycaproic acid, may also be used.

Polyester polyols of oleochemical origin may also be used. Oleochemical polyester polyols may be obtained, for example, by complete ring opening of epoxidized triglycerides of a fatty mixture containing at least partly olefinically unsaturated fatty acids with one or more alcohols containing 1 to 12 carbon atoms and subsequent partial transesterification of the triglyceride derivatives to form alkyl ester polyols with 1 to 12 carbon atoms in the alkyl group.

Some suitable polyols include C36 dimer diols and derivatives thereof. Some suitable polyols include castor oil and derivatives thereof. Some suitable polyols include fatty polyols, for example the products of hydroxylation of unsaturated or polyunsaturated natural oils, the products of hydrogenations of unsaturated and polyunsaturated polyhydroxy natural oils, polyhydroxyl esters of alkyl hydroxyl fatty acids, polymerized natural oils, soybean polyols, and alkylhydroxylated amides of fatty acids. Some suitable polyols include the hydroxy functional polybutadienes known, for example, by the commercial name of "Poly-bd©" available from Cray Valley USA, LLC Exton, PA. Some suitable polyols include polyisobutylene polyols. Some suitable polyols include polyacetal polyols. Polyacetal polyols are understood to be compounds obtainable by reacting glycols, for example diethylene glycol or hexanediol or mixtures thereof, with formaldehyde. Polyacetal polyols may also be obtained by polymerizing cyclic acetals. Some suitable polyols include polycarbonate polyols. Polycarbonate polyols may be obtained, for example, by reacting diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene. Some suitable polyols include polyamide polyols.

Some suitable polyols include polyacrylates containing OH groups. These polyacrylates may be obtained, for example, by polymerizing ethylenically unsaturated monomers bearing an OH group. Such monomers are obtainable, for example, by esterification of ethylenically unsaturated carboxylic acids and dihydric alcohols, the alcohol generally being present in a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

The isocyanate reactive component can be a compound comprising an amine moiety. The amine moieties can be primary amine moieties, secondary amine moieties, or combinations of both. In some embodiments the compound comprises two or more amine moieties independently selected from primary amine moieties and secondary amine moieties (polyamine). In some embodiments the compound can be represented by a structure selected from HRN—Z and HRN—Z—NRH where Z is a hydrocarbyl group having 1 to 20 carbon atoms and R can be a covalent bond, H, hydrocarbyl, heterohydrocarbyl or polyether. In some embodiments Z is a straight or branched alkane or a straight or branched polyether. In some embodiments Z can be a heterohydrocarbyl group. In some embodiments Z can be a polymeric and/or oligomeric backbone. Such polymeric/oligomeric backbone can contain ether, ester, urethane, acrylate linkages. In some embodiments R is H. The term polyamine refers to a compound contains more than one —NHR group where R can be a covalent bond, H, hydrocarbyl, heterohydrocarbyl.

Some suitable amine compounds include but are not limited to aliphatic polyamines, arylaliphatic polyamines, cycloaliphatic polyamines, aromatic polyamines, heterocyclic polyamines, polyalkoxypolyamines, and combinations thereof. The alkoxy group of the polyalkoxypolyamines is an oxyethylene, oxypropylene, oxy-1,2-butylene, oxy-1,4-butylene or a co-polymer thereof.

Examples of aliphatic polyamines include, but are not limited to ethylenediamine (EDA), diethylenetriamine (DETA), triethylenetetramine (TETA), trimethyl hexane diamine (TMDA), hexamethylenediamine (HMDA), N-(2-aminoethyl)-I,3-propanediamine (N3-Amine), N,N'-1,2-ethanediylbis-1,3-propanediamine (N4-amine), and dipropylenetriamine. Examples of arylaliphatic polyamines include, but are not limited to m-xylylenediamine (mXDA), and p-xylylenediamine. Examples of cycloaliphatic polyamines include, but are not limited to 1,3-bisaminocyclohexylamine (1,3-BAC), isophorone diamine (IPDA), and 4,4'-methylenebiscyclohexanamine. Examples of aromatic polyamines include, but are not limited to diethyltoluenediamine (DE-TDA), m-phenylenediamine, diaminodiphenylmethane (DDM), and diaminodiphenylsulfone (DDS). Examples of heterocyclic polyamines include, but are not limited to N-aminoethylpiperazine (NAEP), and 3,9-bis(3-aminopropyl) 2,4,8,10-tetraoxaspiro(5,5)undecane. Examples of polyalkoxypolyamines where the alkoxy group is an oxyethylene, oxypropylene, oxy-1,2-butylene, oxy-1,4-butylene or a co-polymer thereof include, but are not limited to 4,7-dioxadecane-I,10-diamine, 1-propanamine,2, I-ethanediyloxy))bis(diaminopropylated diethylene glycol). Suitable commercially available polyetheramines include those sold by Huntsman under the Jeffamine© trade name. Suitable polyether diamines include Jeffamines® in the D, SD, ED, XTJ, and DR series. Suitable polyether triamines include Jeffamines® in the T and ST series.

Suitable commercially available polyamines also include aspartic ester-based amine-functional resins (Bayer); dimer diamines e.g. Priamine® (Croda); or diamines such as Versalink® (Evonik).

The amine compound may include other functionalities in the molecule. The amine compound encompasses a single compound or a mixture of two or more amine compounds.

The isocyanate reactive component can be a thiol. In some embodiments the thiol comprises two or more —SH moieties (polythiol). In some embodiments the thiol comprises at least one —SH moiety and at least another functional moiety selected from —OH, —NH, —NH$_2$, -GOOH, or epoxide. In some embodiments the thiol can be represented by the structure HS—Z—SH where Z is a hydrocarbyl group, a heterohydrocarbyl group having 1 to 50 carbon atoms. In some embodiments Z is a straight or branched alkane or a straight or branched polyether. Some suitable thiols include but are not limited to pentaerythritol tetra-(3-mercaptopropionate) (PETMP), pentaerythritol tetrakis(3-mercaptobutylate) (PETMB), trimethylolpropane tri-(3-mercaptopropionate) (TMPMP), glycol di-(3-mercaptopropionate) (GDMP), pentaerythritol tetramercaptoacetate (PETMA), trimethylolpropane trimercaptoacetate (TMPMA), glycol dimercaptoacetate (GDMA), ethoxylated trimethylpropane tri(3-mercapto-propionate) 700 (ETTMP 700), ethoxylated trimethylpropane tri(3-mercapto-propionate) 1300 (ETTMP 1300), propylene glycol 3-mercaptopropionate 800 (PPGMP 800), propylene glycol 3-mercaptopropionate 2200 (PPGMP 2200), pentaerythritol tetrakis(3-mercaptobutanoate) (KarenzMT PE-1 from Showa Denko), and soy polythiols (Mercaptanized Soybean Oil). The term "thiol" encompasses a single thiol or a mixture of two or more thiols.

The isocyanate reactive component can be a compound comprising an aminoalcohol moiety. As used herein an aminoalcohol moiety comprises at least one amino moiety and at least one hydroxyl moiety. In some embodiments the amine group is terminal to the aminoalcohol compound molecule. In some embodiments the amine group is a secondary amino group on the chain of the aminoalcohol compound molecule. In some embodiments the aminoalcohol compound includes a terminal primary amine and a secondary amine. In some embodiments the aminoalcohol compound can be represented by one of the following structures: HO—Z—NH—Z—OH or H$_2$N—Z—NH—Z—OH or H$_2$N—Z—(OH)$_2$ where Z is a hydrocarbyl group and/or an heterohydrocarbyl having 1 to 50 carbon atoms. In some embodiments Z is a straight or branched alkane or a straight or branched polyether. In some embodiments Z contains cycloaliphatic moiety or aryl moiety. Some suitable aminoalcohols include but are not limited to diethanolamine, dipropanolamine, 3-amino-1,2-propanediol, 2-amino-1,3-propane diol, 2-amiono-2-methyl-1,3-propanediol, diisopropanolamine. The aminoalcohol compound encompasses a single compound or a mixture of two or more aminoalcohol compounds.

Polyvinyl Acetates and Copolymers Thereof:

Suitable polyvinyl acetates to be included in the polyisocyanate component to increase the viscosity thereof include polyvinyl acetate homopolymers and poly (vinyl acetate/vinyl chloride) copolymers and mixtures thereof. Co-polymers can comprise from about 5% to 95% or from about 20% to about 80% or from about 35% to 65% or about 50% by weight of vinyl acetate with the balance comprising vinyl chloride as the co-monomer. Other suitable co-monomers that can be used with the vinyl acetate either in addition to, or instead of vinyl chloride to form a suitable vinyl acetate co-polymer to use to increase the viscosity of the polyisocyanate are those that are known in the art to co-polymerize with vinyl acetate. Generally, the co-polymer should form a homogenous mixture with the polyisocyanate component, as described in more detail below. Without wishing to be bound by theory, it is expected that more polar co-monomers in combination with the vinyl acetate or vinyl acetate and vinyl chloride in general will form homogenous blends with the polymeric MDI and the polyisocyanate pre-polymers described herein.

Suitable weight average molecular weights for the polyvinyl acetate homopolymer are from about 5000 to 150,000 Daltons or from about 15,000 to 35,000 Daltons. Suitable weight average molecular weights for the vinyl acetate/vinyl chloride copolymers are from 5,000 Daltons to about 150,000 Daltons or from about 45,000 Daltons to about 140,000 Daltons.

Suitable amounts of the polyvinyl acetates (homopolymers and/or copolymers) to be included in the polyisocyanate component to increase the viscosity thereof range up to 35 weight percent, and preferably from 5 to 20 weight percent. The preferred range of the polyvinyl acetate added to the polyisocyanate depends on the desired viscosity. The desired viscosity depends on the application, as well as the viscosity of the polyisocyanate reactive component in the two-component adhesive system. As is known in the art, generally if the viscosities of the two components are similar, they are mixed together more easily.

Additives:

The additives disclosed herein can be contained in either or both of the polyisocyanate component or the polyisocyanate-reactive component (e.g. polyol or polyamine).

The curable compositions disclosed above can include a catalyst or cure-inducing component to modify speed of the initiated reaction. Some suitable catalysts are those conventionally used in polyurethane reactions and polyurethane curing, including organometallic catalysts, organotin catalysts and amine catalysts. Exemplary catalysts include (1,4-diazabicyclo[2.2.2]octane) DABCO® T-12 or DABCO® crystalline, available from Evonik; DMDEE (2,2'-dimorpholinildiethylether); DBU (1,8-diazabicyclo[5.4.0]undec-7-ene). The curable composition can optionally include from about 0.01% to about 10% by weight of composition of one or more catalysts or cure-inducing components. Preferably, the curable composition can optionally include from about 0.05% to about 3% by weight of composition of one or more catalysts or cure-inducing components.

The curable composition can optionally include filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, nanosilica, fumed silicas, silicas that have been surface treated with a silane or silazane such as the AEROSIL® products available from Evonik Industries, silicas that have been surface treated with an acrylate or methacrylate such as AEROSIL® R7200 or R711 available from Evonik Industries, precipitated silicas, untreated silicas, graphite, synthetic fibers and mixtures thereof. When used, filler can be employed in concentrations effective to provide desired properties in the uncured composition and cured reaction products and typically in concentrations of about 0% to about 90% by weight of composition, more typically 1% to 30% by weight of composition of filler. Suitable fillers include organoclays such as, for example, Cloisite® nanoclay sold by Southern Clay Products and exfoliated graphite such as, for example, xGnP® graphene nanoplatelets sold by XG Sciences. In some embodiments, enhanced barrier properties are achieved with suitable fillers.

The curable composition can optionally include a thixotrope or rheology modifier. The thixotropic agent can modify rheological properties of the uncured composition. Some useful thixotropic agents include, for example, silicas, such as fused or fumed silicas, that may be untreated or treated so as to alter the chemical nature of their surface. Virtually any reinforcing fused, precipitated silica, fumed silica or surface treated silica may be used. Examples of treated fumed silicas include polydimethylsiloxane-treated silicas, hexamethyldisilazane-treated silicas and other silazane or silane treated silicas. Such treated silicas are commercially available, such as from Cabot Corporation under the tradename CAB-O-SIL© ND-TS and Evonik Industries under the tradename AEROSIL®, such as AEROSIL® R805. Also useful are the silicas that have been surface treated with an acrylate or methacrylate such as AEROSIL® R7200 or R711 available from Evonik Industries. Examples of untreated silicas include commercially available amorphous silicas such as AEROSIL® 300, AEROSIL® 200 and AEROSIL® 130. Commercially available hydrous silicas include NIPSIL© E150 and NIPSIL® E200A manufactured by Japan Silica Kogya Inc. The rheology modifier can be employed in concentrations effective to provide desired physical properties in the uncured composition and cured reaction products and typically in concentrations of about 0% to about 70% by weight of composition and advantageously in concentrations of about 0% to about 20% by weight of composition. In certain embodiments the filler and the rheology modifier can be the same.

The curable composition can optionally include an antioxidant. Some useful antioxidants include those available commercially from BASF under the tradename IRGANOX®. When used, the antioxidant should be used in the range of about 0 to about 15 weight percent of curable composition, such as about 0.3 to about 1 weight percent of curable composition.

The curable composition can optionally include a reaction modifier. A reaction modifier is a material that will increase or decrease reaction rate of the curable composition. For example, 8-hydroxyquinoline (8-HQ) and derivatives thereof such as 5-hydroxymethyl-8-hydroxyquinoline can be used to adjust the cure speed. When used, the reaction modifier can be used in the range of about 0.001 to about 15 weight percent of curable composition.

The curable composition can optionally contain a thermoplastic polymer in addition those described herein comprising vinyl acetate or vinyl acetate and vinyl chloride ss polymerized units. Non-limiting examples of suitable thermoplastic polymers include acrylic polymer, functional (e.g. containing reactive moieties such as —OH and/or -GOOH) acrylic polymer, non-functional acrylic polymer, acrylic block copolymer, acrylic polymer having tertiary-alkyl amide functionality, polysiloxane polymer, polystyrene copolymer, divinylbenzene copolymer, polyetheramide, polyvinyl acetal, polyvinyl butyral, polyvinyl chloride, methylene polyvinyl ether, cellulose acetate, styrene acrylonitrile, amorphous polyolefin, olefin block copolymer [OBC], polyolefin plastomer, thermoplastic urethane, polyacrylonitrile, ethylene acrylate copolymer, ethylene acrylate terpolymer, ethylene butadiene copolymer and/or block copolymer, styrene butadiene block copolymer, and mixtures of any of the above.

The curable composition can optionally include one or more adhesion promoters that are compatible and known in the art. Examples of useful commercially available adhesion promoters include amino silane, glycidyl silane, mercapto silane, isocyanato silane, vinyl silane, (meth)acrylate silane, and alkyl silane. Common adhesion promoters are available from Momentive under the trade name Silquest or from Wacker Chemie under the trade name Geniosil. Silane terminated oligomers and polymers can also be used. The adhesion promoter can be used in the range of about 0% to about 20% percent by weight of curable composition and advantageously in the range of about 0.1% to about 15% percent by weight of curable composition.

The curable composition can optionally include one or more coloring agents. For some applications a colored composition can be beneficial to allow for inspection of the applied composition. A coloring agent, for example a pigment or dye, can be used to provide a desired color beneficial to the intended application. Exemplary coloring agents include titanium dioxide, C.I. Pigment Blue 28, C.I. Pigment Yellow 53 and phthalocyanine blue BN. In some applications a fluorescent dye can be added to allow inspection of the applied composition under UV radiation. The coloring agent will be present in amounts sufficient to allow observation or detection, for example about 0.002% or more by weight of total composition. The maximum amount is governed by considerations of cost, absorption of radiation and interference with cure of the composition. More desirably, the coloring agent may be present in amounts of up to about 20% by weight of total composition.

The curable composition can optionally include from about 0% to about 20% by weight, for example about 1% to about 20% by weight of composition of other additives known in the arts, such as tackifier, plasticizer, flame retardant, diluent, reactive diluent, moisture scavenger, and combinations of any of the above, to produce desired functional characteristics, providing they do not significantly interfere with the desired properties of the curable composition or cured reaction products of the curable composition.

When used as an adhesive, the curable compositions can optionally include up to 80% by weight of the total weight of the curable composition of a suitable solvent. This type of adhesives is known as solvent-based adhesives. Upon application of the curable composition on a first substrate, the solvent is quickly evaporated away, for example by heated ovens, then a second substrate is laminated onto the curable composition coated side of the first substrate to form a laminated structure.

Representative Procedures:

Preparation of Isocyanate Functional Material with Viscosity-Increasinq Polymers:

The isocyanate was heated to 10° C. above the softening temperature of the PVAc material in a double planetary mixer equipped with heating and cooling. This mixing temperature therefore ranged from 75° C. to 135° C. Once the isocyanate was heated to the target temperature, the PVAc resin (homopolymer or copolymer) was added to the isocyanate and mixed for approximately one hour. Generally, one hour was an adequate time to achieve a complete incorporation of the polymer comprising as polymerized units vinyl acetate or vinyl acetate and vinyl chloride into the isocyanate, if the isocyanate and the polymer resin could form a homogeneous mixture. The homogeneous samples were cooled to approximately 50° C. before discharge.

The term "homogeneous" as used herein is understood to mean that the material is single phase and predominately or completely free from bubbles, unmixed solids, and heterogeneity upon visual inspection and probing with a spatula after cooling. The material appears smooth and consistent during pouring.

In order to assess long-term stability of the samples, the samples were stored at room temperature for at least two months under nitrogen without component separation or reaction. Some samples have been determined to be stable for at least six months under these conditions.

Viscosity Measurement:

Viscosities of all of the samples were measured at 25° C. using a Brookfield Viscometer at 2 RPM and 20 RPM, with RV Spindle 6. All of the viscosities reported herein are as measured at 20 RPM.

Adhesion Under Shear:

Lap shear samples were prepared using Birch substrate TS 264 (3"×1"×0.25"), with a 0.5" overlap, and TS 141 0.010" spacer wire. Samples were controlled at a 1.15 index, so mix ratio was measured by weight. Samples were added to a mixing cup, mixed for 1 min at 1800 rpm, and added to the substrate with 2 spacer wires. Samples were left to cure for 7 days at room temperature. Samples were pulled at 0.5 inch/min. 5 samples were pulled and averaged. "Index" is understood to mean: (number of isocyanate groups/number of groups reacting with the isocyanate)×100.

The weight percent NCO (isocyanate) as listed in the following examples is calculated.

Materials Used in the Examples:

Particular polyisocyanate compounds used herein include the following:

Mondur® MB: high-purity grade difunctional isocyanate, diphenylmethane 4,4'-diisocyanate (Covestro);

Mondur® MLQ: mixture of 4,4'-methylene diphenyl diisocyanate (MDI) and 2,4-MDI; monomer (Covestro);

Mondur® MR light, poly MDI (mixture of polymerized or oligomerized 4,4- and 2,4 MDI (Covestro);

Mondur® CD: modified monomer, modified with carbodiimide (Covestro);

Mondur® PF: quasi-pre-polymer: ratio of diisocyanate: polyol is greater than 2:1, i.e. there is some monomeric disocyanate in the mixture of polymers and oligomers (Covestro);

Mondur® MA 2300: quasi-pre-polymer allophanate based on 4,4' diphenylmethanediisocyanate; i.e. urethane reacted with a diisocyanate (Covestro);

Desmodur® E744: aromatic polyisocyanate pre-polymer based on MDI and tripropylene glycol (Covestro);
Desmodur® E23A: aromatic polyisocyanate pre-polymer based on (2,4-MDI) (Covestro).
Vinnapas® B 1.5: polyvinyl acetate homopolymer, weight average molecular weight of 15,000 Daltons, softening temperature of 65° C. (Wacker Chemie AG);
Vinnapas® B 14: polyvinyl acetate homopolymer, weight average molecular weight of 35,000 Daltons, softening temperature of 101° C. (Wacker Chemie AG);
Vinnol® H 40/60: 61% polyvinyl chloride/39% polyvinyl acetate copolymer; weight average molecular weight of 120,000 Daltons (Wacker Chemie AG).
Elvax® 150: 68% polyethylene/32% vinyl acetate copolymer (DuPont)
Elvax® 750: 91% polyethylene/9% vinyl acetate copolymer; (DuPont)
Vitel® 7900: amorphous copolyester (Bostik)
Vylon® 245: amorphous copolyester MW=19,000 Daltons; (Toyobo)
Vylon® 296: amorphous copolyester MW=14,000 Daltons; (Toyobo)

All polymer molecular weights (MW) are weight average molecular weight in Daltons.

EXAMPLES

Example 1: Effect of Type of Polyvinyl Acetate Polymer and Effect of Molecular Weight of Polymer on Viscosity of Various Isocyanate-Functional Materials The following compositions were mixed according to the general mixing procedure described above. 10% of each thermoplastic was mixed with 90% by weight with each isocyanate composition. The compatible mixtures were those that formed a homogeneous mixture after approximately an hour of mixing and remained homogenous and did not degrade, crystallize or undergo a significant change in viscosity after at least two months of storage under nitrogen.
Properties of the particular materials used are listed below:
The results are presented below in Table 1.

TABLE 1

Viscosities of polyisocyanate components mixed with polymers

| | Polyisocyanate Components | | | | | | | |
|---|---|---|---|---|---|---|---|---|
| | Mondur MLQ | Mondur MR-Light | Mondur CD | Mondur PF | Mondur MA 2300 | Desmodur E744 | Desmodur E 23A | 1 |
| Isocyanate type | monomer | polymeric | monomer | pre-polymer | pre-polymer | pre-polymer | pre-polymer | pre-polymer |
| polyisocyanate type | 4,4' and 2,4 MDI | MDI mixture | Modified | Modified | allophanate | TPG/MDI, 2,4-MDI | Pre-polymer + 2,4 MDI monomer | PPG-1000/MDI |
| Wt % NCO | 33.6 | 31.5 | 29.5 | 22.9 | 23 | 23.5 | 15.4 | 12.7 |
| Viscosity (mPa · s) | 10 | 250 | 50 | 700 | 550 | 750 | 1250 | 2900 |
| Polymers | | | | | | | | |
| Vinnapas ® B 1.5 | NC | 1900 | NC | 7350 | 3150 | 8800 | 4200 | 8750 |
| Vinnapas ® B 14 | NC | 3400 | NC | NT | NT | 14700 | NT | 13450 |
| Vinnol ® H 40/60 | NT | 89000 | NT | NT | NT | 288000 | NT | NC |
| *Elvax ® 150 comparative | NC | NC | NC | NC | NC | NC | NT | NC |
| *Elvax ® 750 comparative | NC | NC | NC | NC | NC | NC | NT | NC |
| *Vitel ® 7900 comparative | NT | NT | NT | NT | NT | NC | NT | NC |
| *Vylon ® 245 comparative | NT | NT | NT | NT | NT | NC | NT | NT |
| *Vylon ® 296 comparative | NT | NT | NT | NT | NT | NC | NT | NT |

Viscosity of polyisocyanate component with 10% by weight of polymer added (mPa · s)
NC is not compatible or incompatible means the mixture under the listed conditions was not homogeneous.
NT is not tested.

This example illustrates the surprising compatibility and the viscosity-increasing ability of the polyvinyl acetate homopolymers of a range of molecular weights and a poly(vinyl acetate/vinyl chloride) copolymer compared to other polymers and co-polymers of vinyl acetate.

Example 2: Effect of Polyvinyl Acetate on Viscosity of a Pre-Polymer

Pre-polymer 1 comprising 50% polyisocyanate as Mondur® MB (4,4'-methylene diphenyl diisocyanate, 33.6 wt. % NCO, MW=250, functionality=2, Covestro) and 50% polypropylene glycol (ARCOL® POLYOL PPG 1000: Molecular weight=1010.8, functionality=2) was synthesized according to the following procedure: The pre-polymer 1 made according to this method had NCO weight % of 12.7 and a Brookfield viscosity at 25° C. of 2900 mPa·sec using spindle 6 at 20 RPM.

50% by weight of MDI (4,4'-methylene diphenyl diisocyanate as Mondur® MB from Covestro) was melted at 50° C. prior to use. The melted MDI was charged into a reactor at 70° C. Then 50% by weight of PPG (polypropylene glycol as ARCOL® POLYOL PPG 1000) was added to the reactor. These reactants were mixed at 70° C. for 1 hour under nitrogen, and then packaged under nitrogen.

The following samples were prepared by making a 20 percent by weight polyvinyl acetate masterbatch of pre-polymer 1 according to the general mixing procedure described above and then diluting the masterbatch as necessary with pre-polymer 1.

The viscosity was measured with a Brookfield rheometer at 20 rpm using spindle 6. The percent NCO shown in the table is calculated. The composition of the mixtures and the obtained viscosities are shown below in Table 2:

TABLE 2

Viscosity of pre-polymer 1 with various amounts of added polyvinyl acetate.
Viscosities are reported in mPa · s.

|  | 2 | 3 | 4 | 5 | 6 |
|---|---|---|---|---|---|
| Mondur ® MB | 50.0% | 47.5% | 45.0% | 42.5% | 40.0% |
| PPG-1000 | 50.0% | 47.5% | 45.0% | 42.5% | 40.0% |
| Vinnapas ® B 1.5 | 0.0% | 5.0% | 10.0% | 15.0% | 20.0% |
| total | 100 | 100 | 100 | 100 | 100 |
| Wt % NCO (calculated) | 12.7 | 12.0 | 11.4 | 10.8 | 10.2 |
| Viscosity 6/20 mPa · sec | 2900 | 5200 | 8600 | 12,800 | 32,400 |
| Increase in viscosity | N/A | 79 | 197 | 341 | 1017 |

The viscosity of the prepolymer 1 as a function of the amount of added polyvinyl acetate is shown in FIG. 1.

Example 3: Effect of Polyvinyl Acetate on Viscosity of a Quasi-Pre-Polymer

Example 3 is similar to Example 2, except that a quasi-pre-polymer was used instead of the prepolymer1. The quasi-pre-polymer used was Desmodur® E-744 (Covestro). Desmodur E-744 contains significant amounts of monomeric 2,4 MDI in addition to an isocyanate functional prepolymer. The various samples were made according to the same procedure described in Example 2, i.e. a masterbatch was prepared according to the general procedure and then diluted as necessary with the quasi-pre-polymer to obtain the desired weight percent of polyvinyl acetate.

Figure 2:
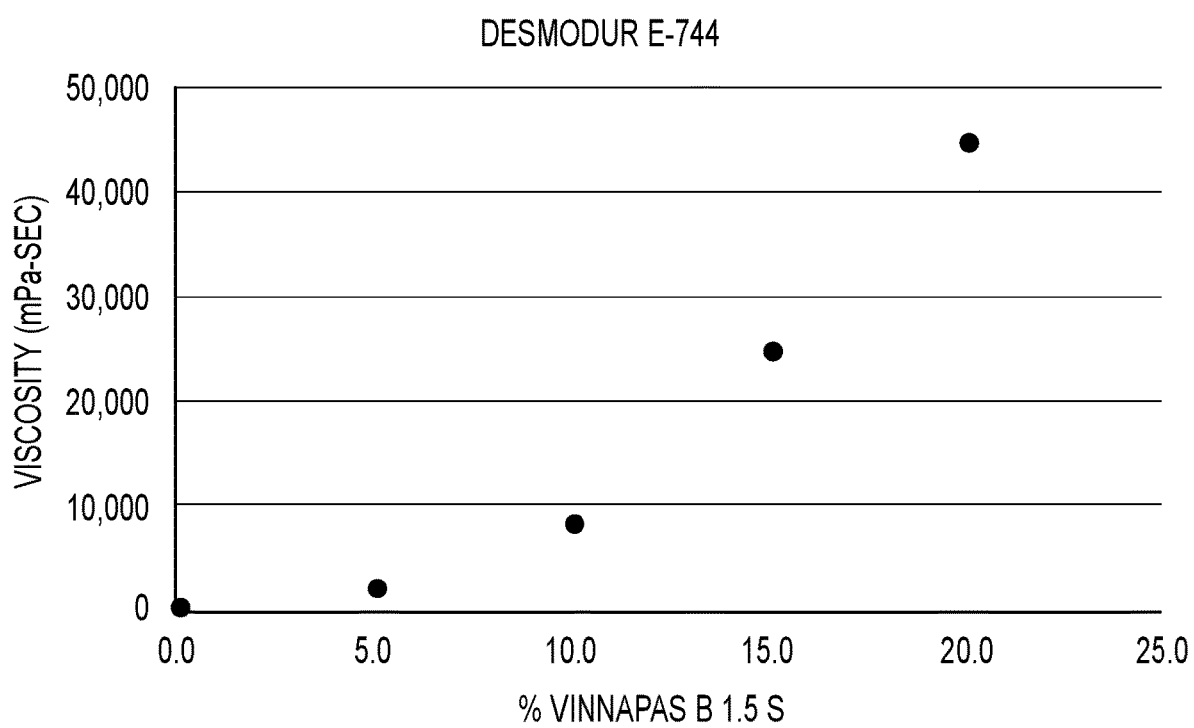
FIG. 2 shows the viscosity of a composition according to another embodiment of the invention.

The results are shown in Table 3 and the viscosity of the Desmodur® E-744 in mPa·s as a function of the amount of polyvinyl acetate is shown in FIG. 2. The viscosity was measured with a Brookfield rheometer at 20 rpm using spindle 6. The percent NCO shown in the table is calculated.

TABLE 3

Viscosity of quasi-pre-polymer Desmodur ® E-744 with various amounts of added polyvinyl acetate.
Viscosities are reported in mPa · s.

|  | 7 | 8 | 9 | 10 | 11 |
|---|---|---|---|---|---|
| Desmodur ® E-744 | 100.0 | 95.0 | 90.0 | 85.0 | 80.0 |
| Vinnapas ® B 1.5 | 0.0% | 5.0% | 10.0% | 15.0% | 20.0% |
| total | 100 | 100 | 100 | 100 | 100 |
| Wt % NCO (calculated) | 23.5 | 22.3 | 21.1 | 20.0 | 18.8 |
| Viscosity 6/20 (mPa · sec) | 750 | 2600 | 8800 | 25,200 | 45,100 |
| Increase in viscosity (%) | N/A | 247 | 1073 | 3260 | 5913 |

Surprisingly, while monomeric 2,4 MDI does not exhibit thickening effects the Desmodur E-744 containing a significant amount of monomeric 2,4 MDI in addition to an isocyanate functional prepolymer thickened appreciably.

Example 4: Effect of Polyvinyl Acetate on Viscosity of Polymeric MDI

Example 4 is similar to Example 3, except that a polymeric MDI was used instead of the quasi-pre-polymer. The polymeric MDI that was used was a commercially available product, Mondur® MR-Light (Covestro). The various samples were made according to the same procedure described in Example 2, i.e. a masterbatch was prepared according to the general procedure and then diluted as necessary with the polymeric MDI to obtain the desired weight percent of polyvinyl acetate.

Figure 3:
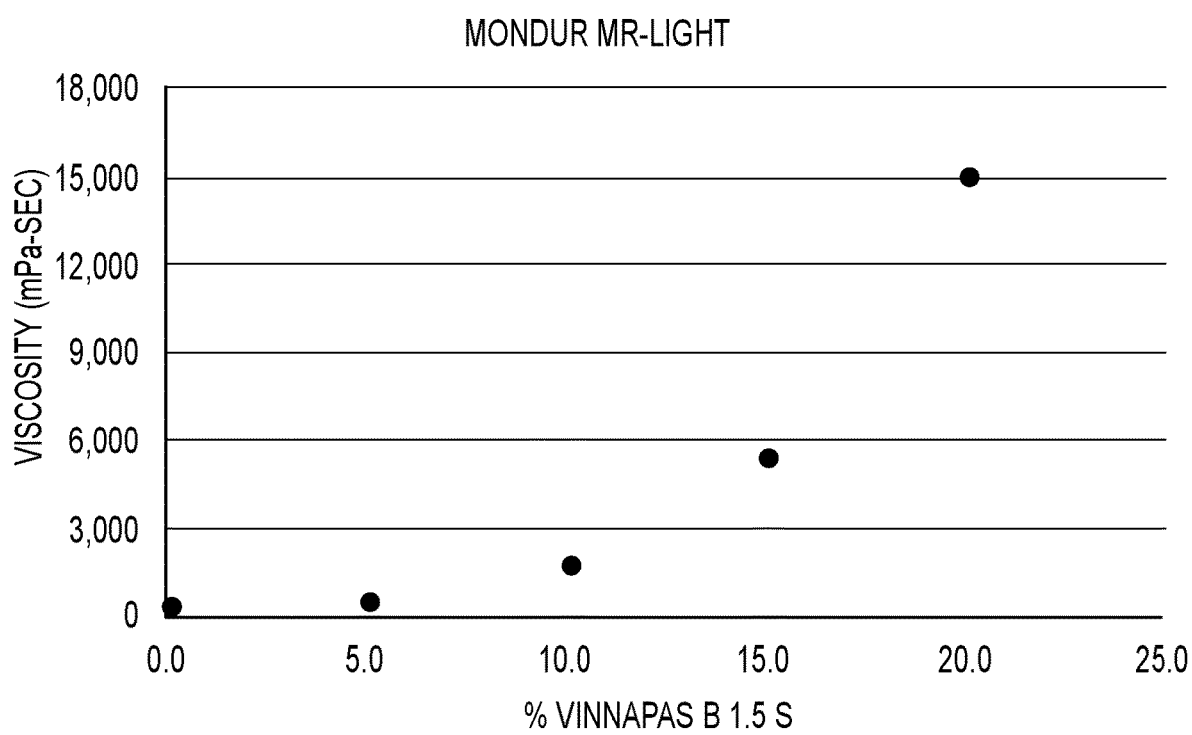
FIG. 3 shows the viscosity of a composition according to still another embodiment of the invention.

The results are shown below in Table 4 and the viscosity of Mondur® MR-Light in mPa·s as a function of the amount of added polyvinyl acetate is shown in FIG. 3. The viscosity was measured with a Brookfield rheometer at 20 rpm using spindle 6. The percent NCO shown in the table is calculated.

TABLE 4

Viscosity of polymeric MDI Mondur ® MR-Light with various amounts of added polyvinyl acetate.

|  | 12 | 13 | 14 | 15 | 16 |
|---|---|---|---|---|---|
| Mondur ® MR-Light | 100.0 | 95.0 | 90.0 | 85.0 | 80.0 |
| Vinnapas ® B 1.5 | 0.0% | 5.0% | 10.0% | 15.0% | 20.0% |
| Wt % NCO (calculated) | 31.5 | 29.2 | 28.4 | 26.8 | 25.2 |
| Viscosity 6/20 (mPa · sec) | 500 | 700 | 1900 | 5500 | 15,100 |
| Increase in viscosity, (%) | N/A | 40 | 280 | 1010 | 2920 |

Example 5: Shear Adhesion of Polyurethane Samples Comprising Polyvinyl Acetate Various polyisocyanate/polyvinyl acetate compositions, prepared according to the general procedure, were mixed with the polyol component of a standard two-component polyurethane adhesive (Loctite© UK U-05FL, Henkel) in order to evaluate the effect of the polyvinyl acetate on the shear adhesion of the two-component polyurethane adhesive composition. The relative amounts of polyisocyanate/polyvinyl acetate component and polyol component of the Loctite® UK U-05FL were selected to obtain an isocyanate index of 1.15 (i.e. the molar ratio of isocyanate groups to hydroxyl groups was 1.15:1). The lap shear strength of the samples were measured and compared to the standard two component adhesive Loctite® UK U-05FL.

The samples were prepared and tested as follows:

Lap shear samples were prepared using birch substrate and spacer wire. Samples were controlled at a 1.15 Index, so the mix ratio was measured by weight. Adhesive samples were prepared by adding the appropriate amounts of the polyisocyanate/polyvinyl acetate component and the Loctite® UK U-05FL polyol component to a mixing cup, and then mixing for 1 minute at 1800 rpm. These adhesive samples were then applied in between two pieces of the birch substrate (3"×1"×0.25" South End Wood Working and Supply), with a 0.5" overlap. Two spacer wires 0.010" from Atlantic Precision Spring were placed in the adhesive of each overlapped area. The samples were left to cure for 7 days at room temperature and then tested.

These samples were pulled at 1.27 cm/min and the lap shear strength in mPa was recorded. Five samples of each adhesive sample were pulled and the averages for each composition are reported in Table 3 along with the standard deviation.

TABLE 5

| | Lap shear strength in mPa | | | | | |
|---|---|---|---|---|---|---|
| | Polyisocyanate component | | | | | |
| | Loctite ® UK U-05FL comparative | Desmodur ® E744 | Mondur ® PF | Mondur ® 2300 | Mondur ® MR-Light | Prepolymer 1 |
| PVAc resin | | | | | | |
| None | 11.46 ± 0.90 | N/A | N/A | N/A | N/A | N/A |
| 10% Vinnepas ® B1.5 | N/A | 6.34 ± 0.61 | 8.34 ± 0.59 | 9.75 ± 0.54 | 5.27 ± 0.72 | 2.26 ± 0.49 |
| 20% Vinnepas ® B1.5 | N/A | 4.41 ± 0.54 | not measured | not measured | not measured | not measured |
| 10% Vinnepas ® B14 | N/A | 6.35 ± 0.63 | not measured | not measured | not measured | not measured |

These results show that the properties of the adhesive are not deteriorated by the presence of the polyvinyl acetate polymer. The reduction of the properties of the adhesive are due only to the expected dilution of the polyisocyanate component.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

What is claimed is:

1. A two-component curable adhesive composition comprising:
    a component A comprising at least one isocyanate-reactive composition, and a component B, wherein component B is an isocyanate functional composition comprising:
        a) an isocyanate material comprising a polyisocyanate, wherein the polyisocyanate has an average isocyanate functionality of at least 2 and has a viscosity measured on a Brookfield viscometer at 20 RPM with spindle 6 at 25° C.; and
        b) a polymer comprising, a vinyl acetate homopolymer, a vinyl acetate/vinyl chloride copolymer or a combination thereof;
    wherein component B is a homogeneous mixture and wherein component B has a component B viscosity measured on a Brookfield viscometer at 20 RPM with spindle 6 at 25° C.

2. The two-component curable adhesive composition according to claim 1, wherein the isocyanate-reactive composition in component A comprises at least one compound selected from polyol, polyamine, polythiol, aminoalcohol, and mixtures thereof.

3. The two-component curable adhesive composition according to claim 1, wherein the isocyanate-reactive composition in component A comprises a polyol.

4. The two-component curable adhesive composition according to claim 1, wherein the polyisocyanate comprises methylene diphenyl diisocyanate.

5. The two-component curable adhesive composition according to claim 1, wherein the polyisocyanate comprises polymeric polyisocyanate.

6. The two-component curable adhesive composition according to claim 1, wherein the component B viscosity is in the range of 500 mPa·sec to 300,000 mPa·sec.

7. The two-component curable adhesive composition according to claim 1, wherein the polymer comprises, as polymerized units, at least 50% by weight of vinyl acetate.

8. The two-component curable adhesive composition according to claim 1, wherein component A and component B are present in a stoichiometric ratio of 1.0: 0.90 to 1.0: 1.40 based on the number of moles of isocyanate-reactive groups in component A and the number of moles of isocyanate groups in component B.

9. The two-component curable adhesive composition according to claim 1, wherein the isocyanate material is a pre-polymer comprising methylene diphenyl diisocyanate.

10. The two-component curable adhesive composition according to claim 1, wherein the polyisocyanate has been reacted with a urethane to afford an allophanate.

11. The two-component curable adhesive composition according to claim 1, wherein the composition viscosity is at least 1000 mPa·sec at a temperature of 25° C.

12. The two-component curable adhesive composition according to claim 1, wherein the polymer comprises the copolymer of vinyl acetate and vinyl chloride.

13. The two-component curable adhesive composition according to claim 1, wherein the vinyl acetate homopolymer has a weight average molecular weight in the range of 15,000 to 35,000 Daltons and the vinyl acetate/vinyl chloride copolymer has a weight average molecular weight in the range of 45,000 Daltons to about 140,000 Daltons.

\* \* \* \* \*